July 7, 1942.   F. W. LEE   2,288,628
ELECTRICAL PHASE SHIFTING
Filed Feb. 25, 1939   3 Sheets-Sheet 2

Fig. 2.

Inventor,
Frederick W. Lee
by,
Attorney.

Patented July 7, 1942

2,288,628

UNITED STATES PATENT OFFICE 2,288,628

ELECTRICAL PHASE SHIFTING

Frederick W. Lee, Owings Mills, Md.

Application February 25, 1939, Serial No. 258,520

12 Claims. (Cl. 172—238)

(Granted under the act of March 3, 1883, as amended April 30, 1928; 370 O. G. 757)

The invention described herein may be used by or for the Government of the United States without payment of any royalty thereon.

This invention relates to electrical phase shifting and aims generally to improve the same.

The invention effects an important improvement in the art of securing the benefit of a rotating magnetic field. In this art the production of a rotating magnetic field by windings angularly displaced in space and energized by currents angularly displaced in time is well understood. However, there are certain inherent defects in and objections to a coil arrangement of this type, especially where precise measuring circuits are involved. In particular, at higher frequencies there is interaction, due to magnetic and electrostatic coupling between the phase circuits. Also, such arrangements generally involve objectionable slots in which the windings are placed with accompanying variable reluctance of the flux paths which do not produce the exact voltages in the secondary for a truly ideal revolving field. Furthermore, in such known devices adjustments are difficult to make in the separate phases for proper amplitude and time-phase control.

In accordance with the present invention, these objections are overcome by the use of separate excitation for each phase and separate secondaries in each phase properly connected to produce, but more exactly and flexibly, the same general effect as was formerly secured by a single revolving field and a single secondary.

The invention further enables the use of the magnetic field in such a manner that the induced voltages in the secondary are exactly proportional to the cosine product of the axes of the primary and secondary coils.

Moreover, this invention enables each phase to be adjusted separately for the precise condition desired without interaction from the other phases.

Further, in accordance with this invention, with low frequencies, the primary coil may be part of an iron circuit in which the secondary is placed in a uniform air gap. At higher frequencies a helmholtz arrangement for the primary of each phase may be employed with proper screening from the adjacent phases.

Further objects and advantages of the invention and of the several subcombinations included therein will be apparent from the following detailed description illustrating representative embodiments thereof, and from which it will be seen that the invention is adaptable for phase splitting, shifting, multiplying or dividing.

In the accompanying drawings illustrating such representative embodiments—

Fig. 2 is a diagrammatic illustration of one manner of reducing the air gap.

Figure 1:
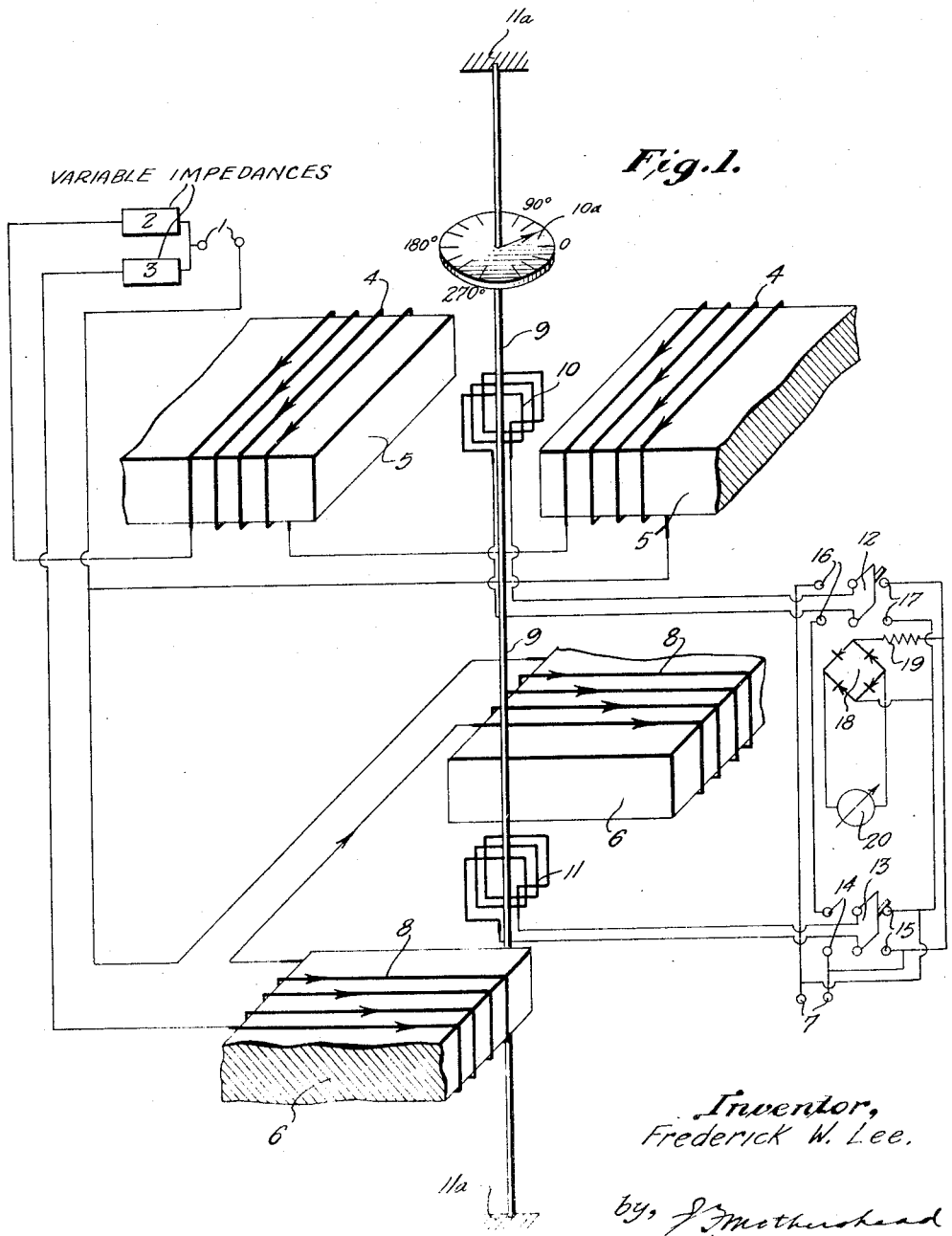
Fig. 1 is a diagrammatic representation of one circuit arrangement.

Referring to the diagrammatic arrangement shown in Fig. 1, the input terminals 1 adapted to receive single phase current from any suitable source are connected with proper phase splitting impedances 2 and 3 to provide a two-phase equivalent. The phased currents thus produced are conducted in parallel through the two primaries 4 and 8, wound respectively on magnetic circuits 5 and 6, which may take the form of laminated iron cores closed except for the air gaps in which secondary coils 10 and 11 are mounted. As is apparent from inspection of Fig. 1, these air gaps provide uniform fields with respect to the secondaries 10 and 11, and for simplicity, each primary 4, 5 and 6, 8 may be referred to as an "element." The magnetic circuits 5 and 6 are isolated from one another in any suitable manner, as by shielding or position isolation, in such a way that there is no interaction between their respective fields. In this way, it is assured that the secondaries 10 and 11 will at all times lie in respectively uniform magnetic fields, that is, fields such that the induced voltage in the secondary is proportional to the cosine product between the direction of the field and the axis of the secondary coil 10 or 11.

In the form shown, the secondaries 10 and 11 are wound on cores, rotation of which does not alter flux distribution in the air gap. For example, a wooden or other dielectric core may be employed. In the form shown, the two magnetic fields 5 and 6 are displaced 90° in space and the secondary coils 10 and 11 are attached to the same mechanical axis 9 suitably supported as by bearings 11a. With the magnetic fields 5 and 6 relatively displaced by 90°, as shown, the axes of the secondaries 10 and 11 are oriented in the same direction so that the maximum voltage is induced in 11 as zero voltage is induced in 10. By turning the axis 9 through 90°, the maximum voltage will be induced in secondary 10, while zero voltage is induced in 11, intermediate shifts being accomplished with the axis 9 turned to an intermediate position. In the form of Fig. 1, secondaries 10 and 11 are connected to suitable switching means as the double pole double throw switches 12 and 13, respectively. By closing switch 12 on contacts 17 with switch 13 open, connection may be made to the D. C. meter 20 through a copper oxide rectifier 18 and a control impedance 19. This enables the current in primary coil 4 to be adjusted as by appropriate variation of impedance 2 for a constant deflection with the secondary 10 in a predetermined, as the maximum voltage, position. Repetition of this adjustment with respect to impedance 3, primary 8 and coil 11 may be effected with switch 13 closed on contacts 15, switch 12 in open position, and coil 11 in maximum voltage position. By then rotating axis 9 through 45° and connecting the secondaries 10 and 11 in series by closing switches 12 and 13 on contacts 16 and 14, respectively, a condition should result in which the volt meter 20 will read the same predetermined value. If this condition is not obtained, the phase in circuits 4 and 8 may be relatively changed by adjustment of impedances 2 and 3 until the proper balanced condition results. In this manner the equivalent of a rotating magnetic field is secured without a rotating magnetic field but by means of two separately oscillating magnetic fields properly displaced in time phase and space from one another.

In order to reduce the magnetizing current required by large air gaps between the ends of core 5 and core 6, an arrangement represented by Fig. 2 may be employed to provide small air gaps with a multiple secondary coil system properly connected electrically and geared mechanically.

Thus in Fig. 2, it is apparent that if the coils 10 and 11 are of relatively large size to enable induction of relatively high voltages, then, to enable turning of the coils 10, 11 through 180° or 360° the coil accommodating spaces between the ends of field pieces 5 and 6, respectively, must be correspondingly wide. However, if, as shown in Fig. 2, the coils 10, 11 are subdivided into a plurality of physically smaller coils, as 30, 31, 32, then the space necessary to enable turning of these smaller coils will be correspondingly reduced, resulting in a shorter air-gap and correspondingly increase magnetic flux therein for the same value of exciting current on the field poles.

The single representative element shown in Fig. 2 comprises a primary or exciting winding 23 and magnetic circuit 24 with a uniform small air gap in which are placed three secondaries, 30, 31 and 32, connected by proper slip ring terminals 33, 34 and 35, and associated with brush connecting circuits 36, 37 and 38. Each coil has its own separate axis and the several coils are geared to a common axis 42 in any suitable manner as by gears 27, 28 and 29, the several axes being suitably supported as by bearings 25, 40 and 41. With this arrangement, the dial 26 controls all secondaries simultaneously. When desired, to avoid variation and mutual inductance between coils 30, 31 and 32, shields of suitable material, as copper shields 43, may be placed in the air gap between the coils.

While for completeness of illustration, a split phase system 1, 2 and 3 has been shown in Fig. 1, elements 5 and 6 may be excited by two separate but phased currents from any source. If three-phase current is available, three elements displaced from each other by 120° may be used. Similarly, a single phase supply with three separate impedances—one producing a 60° leading phase, another a 60° lagging phase, and the third a reversal of the remainder of input current (or if the remainder of input current is not reversed, two impedances, one producing 120° lead, and the other 120° lag) will produce the same effect.

From the foregoing description it will be apparent that the present invention provides a new method of deriving a fluctuating current of any predetermined desired phase from two magnetic fields cyclically energized at the same frequency but in phase quadrature, by inducing geometrically complementary fluctuating currents from said magnetic fields, combining the potentials thus produced to produce a potential having a phase the geometric sum of the two, and varying the complementary distribution of the fluctuating currents to produce any predetermined desired phase with respect to either of the cyclically energized fields. It is further apparent that the physical orientation of the secondaries, as shown, while preferred for simplicity, is in the broader sense representative of any suitable manner of controlling the complementary distribution of induced current drawn from the respective coils, whether by control of coupling as shown, or by any other mode, as variable flux by-passing or primary or secondary impedance control in the respective elements. It is further apparent that the laminated iron core elements shown, while preferred, are in the broader sense representative of any means suitable to the frequencies of current dealt with, for producing a low-loss substantially closed magnetic circuit. The invention in the form illustrated is particularly useful for the extremely accurate phase matching of small fluctuating potentials involved in geophysical surveying, where extremely small power loads are drawn.

Still using the principle of separate primary excitement, in accordance with this invention, a multiple system of secondaries displaced in the same element by fixed numbers of degrees will produce polyphase voltages, if desired, as is apparent from the simple form shown for purposes of illustration.

Figure 3:
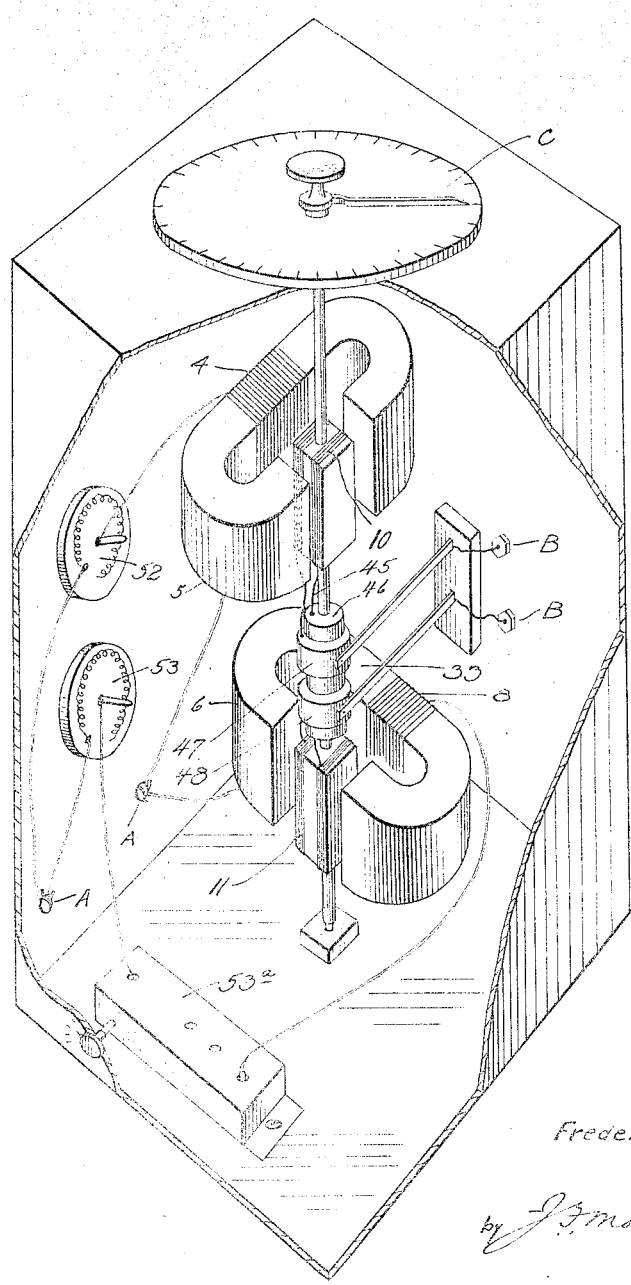
Fig. 3 is an isometric view of a portable unit embodying one form of the invention.

As shown in Fig. 3, a system according to this invention may be incorporated as a small portable unit with input and output terminals A and B (compare 1 and 7, Fig. 1) and phase shift dial C (compare 10—A, Fig. 1) suitably mounted on the unit. The primary coils 4 and 8 carried by the iron cores 5 and 6, preferably laminated; the secondary coils 10 and 11; and slip-ring contacts 33 correspond to those shown in Figs. 1 and 2. In the simplified form shown in Fig. 3, the coils 10 and 11 are interconnected in series by lead 45 passing through insulating member 46, which carries the slip rings 47 and 48, the adjustable resistor 42 constituting one form of impedance 2 (Fig. 1) or 22 (Fig. 2). The adjustable resistor 53 and variable capacity 53A constitute one form of impedance 3 (Fig. 1). This portable unit is particularly, but not exclusively, of utility in alternating or fluctuating current geophysical surveying.

From the foregoing description of illustrated embodiments of the invention it will be perceived that the several inventive principles may be employed in other arrangements and embodied in other forms than those shown for purposes of illustration.

It has been pointed out above, that in accordance with the present invention the apparatus is arranged in a mode such that the magnetic field threading the secondaries in various positions thereof will induce voltages therein proportional to the cosine product between the direction of the field and the direction of presentation of the axis of the secondary coil 10 or 11, and the term "cosine presentation field" used in certain of the following claims is to be interpreted as defining generally such mode of arrangement, which in its simplest form is here embodied by the use of an isolated, uniform, flat-faced air-gap, of such large transverse extent that the vertical legs of the secondary coils 10, 11, do not extend, when in the position 11, laterally of the area of uniform field distribution.

I claim as my invention.

1. Means for generating from a single phase primary current source a secondary potential having any desired time-phase relative to that of the primary current source, comprising means for splitting said primary current into two phases in phase quadrature; two separate electromagnets mutually isolated electrostatically and electromagnetically, connected to be individually energized one by each of said two phases in phase quadrature, each of said electromagnets comprising a substantially closed low loss magnetic path presenting a uniform flux gap and providing a uniformly distributed flux-field pattern throughout a substantial zone of said flux-gap; two series-connected secondary coils; single-phase potential output terminals bridged by said secondary coils; said secondary coils being mounted one in each of said flux gaps in the zone of uniform flux field therein, and being oriented at right angle time phase to one another so that when one coil is in maximum flux-cutting position the other is in minimum flux-cutting position; and means for concurrently rotating said two coils through equal angles relative to their associated flux fields to change the time phase of the potential delivered to said output terminals relative to that of the single phase primary current source.

2. Means for deriving an output of at least one time phase of potential from a source of polyphase input potential, comprising, in combination; a number of separate primary elements, mutually isolated electrostatically and electromagnetically, corresponding to the number of phases of said polyphase input potential, and connected to be individually energized by the respective phases of said polyphase input; said primary elements having flux gaps presenting a flux distribution uniform in at least one direction transverse to the lines of their flux fields; a corresponding number of series connected secondary coil means per output phase desired, with one of said coil means in each flux gap; output terminals bridged by said series connected coil means; the several series connected coil means being arranged in space phase to their respective flux fields differing in angularity from one another by the angles between the phases of said input potential, whereby there is delivered to said output terminals a potential of predetermined time phase relative to that of one of said input phase potentials.

3. Means for deriving an output of at least one time phase of potential from a source of polyphase input potential, comprising, in combination; a number of separate primary elements, mutually isolated electrostatically and electromagnetically, corresponding to the number of phases of said polyphase input potential, and connected to be individually energized by the respective phases of said polyphase input; said primary elements having flux gaps presenting a flux distribution uniform in at least one direction transverse to the lines of their flux fields; a corresponding number of series connected secondary coil means per output phase desired, with one of said coil means in each flux gap; output terminals bridged by said series connected coil means; the several series connected coil means being arranged in space phase to their respective flux fields differing in angularity from one another by the angles between the phases of said input potential, and means for concurrently rotating said coil means through equal angles relative to their associated flux fields to change the time phase of the potential delivered to said output terminals relative to that of one of said input phase potentials.

4. A combination according to claim 2, in which each of said coil means comprises a plurality of series connected coils having a common orientation in the associated flux gap.

5. A combination according to claim 2, in which each of said coil means comprises a plurality of series connected coils having a common orientation in the associated flux gap, and in which the several coils of each coil means are shielded from one another by shielding means aligned with the elements of the flux field between said several coils.

6. A phase changer according to claim 3, further comprising a calibrating circuit including voltage measuring means; means for selectively connecting said secondary coil means individually and in series to said voltage measuring means; and variable impedance means for relatively varying the input to said respective primary elements; whereby the phase changer may be adjusted to provide the same output voltage for each of said secondary means when in maximum flux cutting position, and for said series connected secondary means in any position thereof.

7. A phase changer comprising means for generating two uniformly distributed flux fields mutually isolated from one another electrostatically and electromagnetically and in time-phase quadrature to each other; secondary coil means associated with each uniformly distributed flux field; said secondary means being connected in series and being relatively oriented so that when one is in maximum flux-cutting position the other is in zero flux-cutting position; and means for rotating said secondary coil means through equal angles relative to their flux fields to change the time-phase of their output potential relative to the time-phase of one of said flux fields.

8. A phase changer comprising means for generating two uniformly distributed flux fields mutually isolated from one another electrostatically and electromagnetically and in time-phase quadrature to each other; secondary coil means associated with each uniformly distributed flux field; said secondary coil means being connectable in series and being relatively oriented so that when one is in maximum flux-cutting position the other is in zero flux-cutting position; means for rotating said secondary coil means through equal angles relative to their flux fields to change the time-phase of their output potential relative to the time-phase of one of said flux fields; a calibrating circuit including voltage measuring means; means for connecting said secondary coil means individually, and collectively in series, to said voltage measuring means; and means for varying the magnitude and phase of the respective fields produced by said generating means; whereby the phase changer may be adjusted to provide the same output voltage for each of said secondary means when in maximum flux-cutting position, and for the several secondary means in series, in any position of rotation thereof.

9. A phase changer according to claim 7 in which each of said secondary coil means comprises a plurality of sub-coils having the same space-phase orientation relative to the uniform flux field with which it is associated, and disposed in non-inductive relation to one another.

10. A phase changer comprising means for generating uniformly distributed, mutually isolated flux-fields in polyphase relation to one another from the separate phases of a polyphase input; secondary coil means associated with each uniformly distributed flux field; said secondary coil means being connected in series between output terminals and being relatively oriented in space-phase to their respective flux fields in polyphase relation, whereby the resultant output potential at the output terminals for a given space-phase position of the series-connected coils is a single-phase potential having a time-phase corresponding to the space-phase relation of the coils to the uniform flux fields; and means for rotating said secondary coil means through equal angles relative to their flux fields, whereby the relative time phase of the output may be changed along the time axis by rotating the coils to changed space-phase positions in the flux fields with which they are associated.

11. A phase changer according to claim 10, having a polyphase output functionally comprising a plurality of pairs of said output terminals; further having a plurality of said series-connected secondary coil means, one for each output phase desired, connected, respectively, between the output terminals for the respective output phases; and further having said several series-connected secondaries mutually related in space-phase to correspond to the time-phase relation of the several phases of the poly-phase output.

12. A device of the class described, comprising a number of electromagnets adapted to be excited, respectively, by an equal number of phases of polyphase current and producing flux fields substantially uniform in at least one direction transverse to their lines of flux; an equal number of secondary coil means connectable in series with each other for each phase of output potential desired, relatively oriented in polyphase relation, concurrently rotatable through equal angles in said fields, and embacing, in their various angular positions, quantities of flux proportional to the cosines of their angles of rotation from their maximum flux cutting positions; adjustable means for controlling the strength and relative time phase of the fields of the respective electromagnets; calibrating means including a voltage measuring instrument; and means selectively connecting said secondary coil means individually and in series to said calibrating means, so that by adjusting the respective fields in magnitude and phase equal voltages may be set up in the secondary coil means, individually when in their respective maximum flux cutting positions, and collectively in any angular position thereof when connected in series.

FREDERICK W. LEE.